United States Patent Office 3,080,282
Patented Mar. 5, 1963

3,080,282
ANTHELMINTIC BENZIMIDAZOLE COMPOSITIONS AND METHODS OF USING SAME
Clifford H. Shunk, Westfield, N.J., assignor to Merck & Co., Inc., Rahway, N.J., a corporation of New Jersey
No Drawing. Filed Apr. 14, 1960, Ser. No. 22,102
7 Claims. (Cl. 167—53)

This invention is concerned with the treatment of parasites. It relates broadly to a new group of anthelminthic compounds. It is also concerned with new compositions useful in treating helminthiasis. In addition, it relates to new methods of employing such compounds and compositions in the treatment and/or prevention of helminthiasis. It relates further to methods of preparing novel anthelmintic compositions. More specifically, it is concerned with the use of 2-phenyl benzimidazoles as anthelmintics and with compositions containing said substances as an active anthelmintic agent.

The disease or group of diseases described generally as helminthiasis is due to infestation of the animal body with parasitic worms known as helminths. Helminthiasis is a prevalent and serious economical problem in domesticated animals such as swine, sheep, cattle, goats, dogs and poultry. Among the helminths, the group of worms described as nematodes causes widespread and oftentimes serious infections in various species of animals. Certain species of nematodes also lead to troublesome infections in humans, particularly in the tropical climates. The most common genera of nematodes infecting the animals referred to above are Haemonchus, Trichostrongylus, Ostertagia, Nematodirus, Cooperia, Bunostomum, Oesophagostomum, Chabertia, Trichuris (whipworm), Ascaris, Capillaria, Heterakis and Ancylostoma. Certain of these, such as Trichostrongylus, Nematodirus and Cooperia, attack primarily the intestinal tract while others, such as Haemonchus and Ostertagia, are more prevalent in the stomach. The parasitic infections known as helminthiases lead to anemia, malnutrition, weakness, weight loss, severe damage to the walls of the intestinal tract and, if left untreated, often result in death of the infected animals.

Several compounds have been described as useful in treating helminthiasis. Among these are hygromycin, phenothiazine, piperazine, and derivatives thereof. However, the compounds heretofore available suffer from various drawbacks such as undesirable side effects when administered continuously or in large doses, and a relatively narrow spectrum of activity. In addition, strains of helminths resistant to these known compounds have developed, thus limiting the effectiveness of such anthelmintics.

It is an object of the present invention to provide a new group of anthelmintic agents. It is another object to provide anthelmintic compounds which have activity against a broad spectrum of nematodes with a minimum of undesirable side effects. It is a still further object to provide novel anthelmintic compositions and methods of employing such compositions in the treatment and/or prevention of helminthiasis. A further object is provision of methods for preparing such anthelmintics and compositions containing them as an active antiparasitic ingredient. Additional and further objects will be apparent from the ensuing detailed discussion of this invention.

According to the present invention, it has now been found that 2-phenyl benzimidazoles having the general structural formula

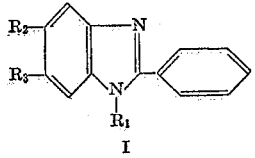

I are highly effective anthelmintic agents. In this formula, $R_1$ is hydrogen or a lower alkyl, lower alkenyl, aralkyl or aralkenyl radical, $R_2$ is hydrogen, a lower alkyl or a lower alkoxy group, and $R_3$ may be hydrogen or lower alkyl when $R_2$ is hydrogen or lower alkyl. When $R_2$ is a lower alkoxy radical, $R_3$ is hydrogen. Acid addition salts of such benzimidazoles possess substantial anthelmintic activity and are within the scope of the invention.

As is evident from the above structural formula, all of the compounds of this invention have a phenyl radical at the 2 position of the benzimidazole nucleus. Although the preferred antiparasitic agent is 2-phenyl benzimidazole itself, the 1, 5 and/or 6 positions of the benzimidazole ring may, if desired, be substituted as disclosed above. The possible substituents at the 1 position include lower alkyl groups such as methyl, ethyl, propyl, butyl, isopropyl and the like, alkenyl substituents of the type exemplified by allyl and methallyl, aralkyl groups such as benzyl or phenylethyl, as well as aralkenyl radicals of which the cinnamyl group is representative. The 5 and/or 6 positions of the benzimidazole may also be lower alkylated as with methyl, ethyl or propyl radicals. Alternatively, the 5 position may contain a lower alkoxy group such as a methoxy, ethoxy or isopropoxy radical. When there is such a lower alkoxy radical in these benzimidazoles, the adjacent 6 position is preferably not alkylated. As typical examples of the 2-phenyl benzimidazoles within the scope of this invention there may be mentioned 2-phenyl benzimidazole, 1-benzyl-2-phenyl benzimidazole, 1-methyl-2-phenyl benzimidazole, 1-allyl-2-phenyl benzimidazole, 1-ethyl-2-phenyl benzimidazole, 1-butyl-2-phenyl benzimidazole, 1-cinnamyl-2-phenyl benzimidazole, 2-phenyl-5-methoxy benzimidazole, 2-phenyl-5,6-dimethyl benzimidazole, 2-phenyl-5-ethoxy benzimidazole, 1,5-dimethyl-2-phenyl benzimidazole and the like.

Acid addition salts of the 2-phenyl benzimidazoles are sometimes preferred over the free bases for treatment of helminthiasis. The salts are conveniently prepared by intimately contacting the base with a molar excess of acid. Although many of the salts are more soluble in water or polar solvents, such as lower alkanols, than are the corresponding bases, the salts are readily crystallized from such solvents as alcohol-ether or acetone. Typical salts of the 2-phenyl benzimidazoles that may be effectively employed as anthelmintic agents are mineral acid salts such as the hydrochloride, hydrobromide, hydroiodide, sulfate, nitrate, phosphate and the like, salts of aliphatic acids such as the acetate, propionate, trimethylacetate, or t-butylacetate, and salts of polycarboxylic acids such as the succinate, oxalate, tartrate and the like. It is preferred to employ the mineral acid addition salts since they appear to be the most satisfactory from a stability standpoint. It is of course desirable that the particular salt be substantially non-toxic for the animal at the dose level employed.

Certain of the 2-phenyl benzimidazoles which have been found to possess anthelmintic activity have been previously described in the literature. These include 2-phenyl benzimidazole itself as well as the 1-methyl and 1-ethyl derivatives thereof. The heretofore unknown 1-substituted 2-phenyl benzimidazoles may be synthesized by alkylation or alkenylation of 2-phenyl benzimidazole. This process is brought about by forming an alkali metal salt of the 2-phenyl benzimidazole, such as the sodium or potassium salt, and intimately contacting such salt with the appropriate alkyl or alkenyl halide. The reaction proceeds satisfactorily when substantially equimolar amounts of the benzimidazole salt and the alkylating agent are employed although, if desired, a molar excess of the alkylating agent may be utilized without adverse effect. The reaction is preferably conducted in an inert solvent medium such as benzene, toluene or xylene, or in mixtures of such solvents with a second solvent such as dimethylformamide. The alkylation may be brought about at about room temperature although for best results it is preferred to employ elevated temperatures within the range of about 50° to about 100° C. The reaction time is not critical, and good results are normally obtained in from 15 minutes to 1 hour.

In preparing 2-phenyl benzimidazoles substituted at the 5 and/or 6 positions (where $R_2$ in Formula I above is lower alkyl or lower alkoxy and $R_3$ is lower alkyl), 1-loweralkyl-3,4-diaminobenzene or a 1,2-diloweralkyl-4,5-diaminobenzene or 1-loweralkoxy-3,4-diaminobenzene is reacted with benzoic acid or a derivative thereof such as a lower alkyl benzoate or benzamide in a polyphosphoric acid medium. This process is preferably conducted by intimately contacting the reactants at elevated temperatures in the range of about 150-300° C. The optimum reaction time depends to a large extent on the reaction temperature, and good yields of the desired compounds are obtained by carrying out the process at about 175° to about 275° C. for 1-5 hours. Although the relative amount of reactants is not a critical aspect of this invention, it may be stated that the diamine and the benzoic acid or benzoic acid derivative are preferably employed in substantially equimolar amounts. It is further preferred to use as the reaction medium from about 5 to about 20 parts by weight of polyphosphoric acid per part of benzoic acid (or benzoic acid derivative). The desired 2-phenyl-5-substituted or 2-phenyl-5,6-disubstituted benzimidazoles are recovered by cooling the reaction mixture and diluting it with water. If the benzimidazoles do not crystallize readily under these conditions, they are precipitated by neutralizing the diluted reaction mixture with a base. These 5 and/or 6-substituted-2-phenyl benzimidazoles do not crystallize readily under these conditions, they are precipitated by neutralizing the diluted reaction mixture with a base. These 5 and/or 6-substituted-2-phenyl benzimidazoles may be alkylated at the 1 position of the benzimidazole ring by the alkylation procedure previously described.

As discussed more fully hereafter, 2-phenyl benzimidazoles described herein and defined by structural Formula I are intimately dispersed in a suitable orally administrable carrier vehicle for use as anthelmintics. They exhibit slightly different degrees of activity although all of them are effective in treating helminthiasis infections. The preferred dosage level for treating a helminthic infection will depend to a large extent on the particular 2-phenyl benzimidazole being employed, on the severity of the infection and on the particular species of animal to be treated. In general, the 2-phenyl benzimidazoles exhibit anthelmintic activity when administered to animals in a daily dose of about 125 to about 600 mg. per kilogram of animal body weight. It is preferred to employ in the range of 200-500 mg. per kilogram of body weight per day. The compounds may be given in a single dose or divided into a plurality of smaller doses. With the 2-phenyl benzimidazoles of this invention highly satisfactory results in freeing the animal of helminths are achieved by administering the compounds for only a single day at the above levels. If desired, the course of treatment may be extended over a period of days in which case the optimum daily dose level may be lowered.

When the compounds are to be employed primarily as prophylactic agents for the prevention of helminthic infections, the preferred daily dose level is, of course, lower than the therapeutic level and is preferably in the range of about 10-100 mg. per kilogram of body weight. The 2-phenyl benzimidazoles may be incorporated in the animal feedstuffs, and this method of administration is preferred when the compounds are to be used prophylactically. They are incorporated in the feeds at concentrations such that the animal will consume daily from about 10 to about 100 mg. of 2-phenyl benzimidazole per kilogram of body weight.

The means employed for administering these benzimidazoles to animals are not critical and any of the methods now used or available for treating animals infected with or susceptible to parasitic infections are satisfactory for treating helminthiasis with the 2-phenyl benzimidazoles described herein. When these substances are employed therapeutically to treat an established infection, they are conveniently administered in a unit dosage form such as in a capsule, bolus, tablet or as a liquid drench. It will be noted that all of these methods contemplate oral administration since this is the most effective method of treating the worm-infested stomach or intestinal tract.

When the 2-phenyl benzimidazoles are to be administered in dry, solid unit dosage form, capsules, boluses or tablets containing the desired amount of anthelmintic distributed in a pharmaceutically acceptable vehicle are usually employed. These are prepared by intimately and uniformly mixing the active ingredient with suitable finely divided diluents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired and the severity and type of parasitic infestation. For large animals such as sheep, swine or cattle, boluses weighing up to 15 grams may be used although it is preferred to employ boluses weighing from 5-10 grams and containing from 2-8 grams of the 2-phenyl benzimidazole. These boluses as well as smaller size tablets contain binders and lubricants, and are compounded by techniques known in this art. Capsules are readily prepared by mixing the active ingredient with a diluent such as starch or lactose and filling into the capsule.

In order to treat infected animals by means of a drench, the 2-phenyl benzimidazoles are mixed with a suspending agent such as bentonite and the solid product added to water just prior to administration. Alternatively, ready to use drench formulations, such as those disclosed in U.S. Patent No. 2,918,403, are sometimes utilized. The preferred drenches in accordance with this invention contain from about 5-50% by weight of 2-phenyl benzimidazole compound.

The 2-phenyl benzimidazoles described herein may also be administered as a component of the feed of the animals or dissolved or suspended in the drinking water. According to the invention, novel compositions are provided in which compounds of Formula I above are present as an active anthelmintic ingredient. Such compositions comprise the benzimidazoles intimately dispersed in or admixed with an inert carrier or diluent. By an inert carrier is meant one that is nonreactive with respect to the 2-phenyl benzimidazole and that may be administered with safety to the animals. The carrier or diluent is preferably one that is or may be an ingredient of the animal ration.

These compositions include feed supplements in which the active ingredient is present in relatively large amounts and which are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 5% to about 50% by weight, and preferably from about 10–30% by weight of active ingredient are particularly suitable for addition to feeds. The active compound is normally dispersed or mixed uniformly in the diluent but in some instances may be sorbed on the carrier.

Examples of typical feed supplements containing a 2-phenyl benzimidazole dispersed in a solid carrier are:

|  | Lbs. |
|---|---|
| (A) 2-Phenyl benzimidazole | 20.0 |
| Corn distillers' dried grains | 80.0 |
| (B) 2-Phenyl benzimidazole hydrochloride | 5.0 |
| Wheat standard middling | 95.0 |
| (C) 2-Phenyl-5-methoxy benzimidazole | 35.0 |
| Wheat shorts | 65.0 |
| (D) 1-Methyl-2-phenyl benzimidazole | 50.0 |
| Corn distillers' grains | 50.0 |

These and similar feed supplements are prepared by uniformly mixing the 2-phenyl benzimidazole with the carrier or carriers.

These supplements are added to the finished animal feed in an amount adequate to give the final concentration desired for controlling or treating helminthiasis by way of the animal ration. Although the preferred level in feeds will depend on the particular compound being employed, the 2-phenyl benzimidazoles of this invention are normally fed at levels of 0.5–2.0% in the feed. One advantageous method of administering the compounds of this invention to animals whose feeds are conveniently pelleted, such as sheep, is to incorporate them directly in the pellets. For instance, 2-phenyl benzimidazole is readily incorporated in nutritionally adequate alfalfa pellets (during the pelleting operation) at levels of 1 to 5 grams per pound of pellets for therapeutic use, and at lower levels for prophylactic use, and such pellets fed to the worm-infested animals. Alternatively, the 2-phenyl benzimidazoles may be incorporated in salt licks or salt blocks at any desired concentration (concentrations of 5–25% by weight are conveniently employed). Large animals, such as sheep, cattle and swine, then receive the anthelmintics with their salt.

The following examples are given for the purpose of illustration and not by way of limitation:

EXAMPLE 1

2-phenyl benzimidazole may be prepared according to the procedure described by Hein, J. Am. Chem. Soc. 79, 427 (1957).

The 1-substituted 2-phenyl benzimidazoles are obtained by reacting together 2-phenyl benzimidazole and an appropriate alkyl, aralkyl or aralkenyl halide. Thus, 1-allyl-2-phenyl benzimidazole is made in the following manner:

(A) To 9.5 g. of 2-phenyl benzimidazole in 100 ml. of dry dimethylformamide is added 2.3 g. of a 52% sodium hydride emulsion in mineral oil. The mixture is stirred at room temperature for about 20 minutes and then warmed carefully to about 50° C. for 10 minutes. It is cooled to room temperature and 6.0 g. (.05 M) of allyl bromide in 10 ml. of dimethylformamide is added slowly to the cooled solution. The reaction mixture is then heated to about 80° C. for 20 minutes, cooled, diluted with 200 ml. of water and extracted with three 100-ml. portions of ether. The ether extracts are combined, washed with water, dried over sodium sulfate, filtered and the ether removed in vacuo to give 1-allyl-2-phenyl benzimidazole. On crystallization from ethyl acetate the compound melts at 88–89° C.

(B) 1-cinnamyl-2-phenyl benzimidazole, M.P. 120–121.5° C., is made by reacting together 0.05 M of cinnamyl chloride and 0.05 M of the sodium salt of 2-phenyl benzimidazole by the procedure of part A above.

(C) By intimately contacting the sodium salt of 2-phenyl benzimidazole with propyl chloride, phenylethyl chloride, benzyl bromide, methallyl iodide, p-chlorobenzyl chloride and isopropyl chloride according to the process set forth for making 1-allyl-2-phenyl benzimidazole, there are obtained respectively the 1-propyl, 1-phenethyl, 1-benzyl, 1-methallyl, 1-p-chlorobenzyl and 1-isopropyl 2-phenyl benzimidazoles. In some cases, and particularly when the N-1 radical is unsaturated, one recrystallization does not yield substantially pure material. Such compounds are further purified by chromatography on neutral alumina, and elution of the desired 2-phenyl benzimidazole with ether or ethyl acetate.

EXAMPLE 2

*2-Phenyl-5,6-Dimethyl Benzimidazole*

A mixture of 6.8 g. of 4,5-dimethyl-o-phenylenediamine, 7.5 g. of ethyl benzoate and 130 g. of polyphosphoric acid is heated with stirring at 245° C. for 4 hours. The mixture is cooled and poured into excess ice water with vigorous stirring. The resulting solution is filtered to remove any insoluble materials and the filtrate treated with decolorizing charcoal. The charcoal is removed by filtration. Fifty percent sodium hydroxide solution is added to the filtrate until the filtrate is just pink to phenolphthalein indicator. At this point 2-phenyl-5,6-dimethyl benzimidazole precipitates from solution. The product is purified by dissolving in hot ethanol and adding water to the ethanol solution slowly until crystallization begins. The compound is recovered by filtration and washed with cold ethanol.

In a similar fashion, 2-phenyl-5-methyl benzimidazole and 2-phenyl-5-methoxy benzimidazole are prepared using 6.0 g. of 4-methyl-o-phenylenediamine or 4-methoxy-o-phenylenediamine as the starting material in the above process.

EXAMPLE 3

2 g. of 2-phenyl benzimidazole is added slowly with stirring to 100 ml. of ethanolic hydrogen chloride. The resulting solution is warmed to about 40° C. and treated with 2 g. of decolorizing charcoal. The charcoal is removed by filtering and the filtrate diluted with 3 times its volume of ethyl ether. Upon cooling the resulting mixture, crystals of 2-phenyl benzimidazole hydrochloride are obtained.

When the above procedure is repeated employing 1-methyl-2-phenyl benzimidazole, there is produced 1-methyl-2-phenyl benzimidazole hydrochloride.

A solution of 500 mg. of 1-allyl-2-phenyl benzimidazole in 25 ml. of ethanol is treated with about 1 ml. of 50% sulfuric acid. The mixture is diluted with ether until turbid and then chilled in ice. On standing, 1-allyl-2-phenyl benzimidazole sulfate precipitates.

EXAMPLE 4

Four sheep naturally infected with gastrointestinal nematodes (worms) were each fed 500 mg./kg. of body weight of 2-phenyl benzimidazole. The 2-phenyl benzimidazole was fed in capsular form in a single oral dose. The effect of 2-phenyl benzimidazole on the gastrointestinal worms was determined by counting the eggs present in the feces before and after treatment. Before administration of the anthelmintic agent, the mean number of eggs per gram of feces for these sheep was 4,220. After 48 hours there was a marked decrease in egg count (eggs per gram of feces). Three weeks after treatment, the mean number of eggs was 106. The mean number of adult worms expelled in the feces in a 72 hour post-treatment period was 13,150.

Two sheep infected with gastrointestinal worms were treated with 250 mg./kg. of body weight of 2-phenyl benzimidazole. The mean number of eggs per gram of feces was 2,740 before treatment. Three weeks after treatment, the mean number of eggs per gram of feces was 77.

In both of these experiments, the egg counts were also determined 28 days after treatment and found to be less than 200. These data demonstrate the effect of 2-phenyl benzimidazole in reducing the number of worm eggs in feces. The egg counts reflect generally the extent of worm infestation of the gastrointestinal tract. The number of worm eggs per gram of feces are determined by the Stoll method which is known in the art.

The anthelmintic efficacy of the 2-phenyl benzimidazoles of this invention is also determined by recovering the worms expelled in the feces following treatment with the anthelmintic agent. All feces passed for 72 hours after treatment are collected in sacks fitted over the hindquarters of the animals at the time of dosing. The fecal material is diluted with water to a volume of 4 or 8 liters and stirred to a uniform suspension. An aliquot one-tenth the volume of the suspension is removed, and the worms collected on a 40 mesh screen. The worms, preserved in 2% formalin, are counted and identified microscopically.

In the above experiments, the mean number of worms recovered from the four sheep fed 500 mg./kg. of 2-phenyl benzimidazole was 13,150, and from the two sheep fed 250 mg./kg. of 2-phenyl benzimidazole 7,550. The species of worms recovered include *Maemonchus contortus, Trichostrongylus axei, Ostertagia circumcincta, Trichostrongylus colubriformis, Trichostrongylus vitrinus, Cooperia "curticei," Nematodirus spathiger, Bunostomum trigonocephalum, Oesophogostomum columbianum, Chabertia ovina* and *Trichuris ovis*.

EXAMPLE 5

The compounds listed below, when fed orally to mice infected with *Nematospiroides dubius*, prevented nematode larval development at the dose levels shown:

|  | Dose, mg./kg. |
|---|---|
| 2-phenyl benzimidazole | 250; 500 |
| 1-methyl-2-phenyl benzimidazole | 250; 500 |
| 1-allyl-2-benzimidazole | 125 |
| 1-benzyl-2-phenyl benzimidazole | 500; 250 |
| 1-cinnamyl-2-phenyl benzimidazole | 500; 250 |
| 2-phenyl-5-methoxy benzimidazole hydrochloride | 500; 250; 125 |

EXAMPLE 6

Boluses of 2-phenyl benzimidazole suitable for oral administration to domesticated animals are prepared having the following composition:

|  | (A) Gm. | (B) Gm. |
|---|---|---|
| 2-Phenyl benzimidazole | 2.0 | 4.0 |
| Dicalcium Phosphate | 3.0 | 1.0 |
| Starch | 0.535 | 0.702 |
| Guar Gum | 0.15 | 0.16 |
| Talc | 0.14 | 0.11 |
| Magnesium Stearate | 0.04 | 0.028 |

(A) To prepare A above, the dicalcium phosphate is thoroughly mixed with the 2-phenyl benzimidazole and the mixture reduced to a particle size finer than 60 mesh. To the mixture is added 0.330 gm. of starch in the form of an aqueous starch paste and the resulting mixture granulated in the usual manner. The granules are then passed through a #10 mesh screen and dried at 110°–130° F. for about 8 hours, and the dried material then passed through a #16 mesh screen. The guar gum and the balance of the starch are added and the mixture throughly blended. The remainder of the ingredients are then added and the whole thoroughly mixed and compressed.

(B) Preparation B is made by thoroughly mixing the dicalcium phosphate with the 2-phenyl benzimidazole and reducing the mixture to a particle size finer than 60 mesh. To the mixture is added 0.430 gm. of starch in the form of an aqueous starch paste and the resulting mixture is then granulated in the usual manner. The granules are passed through a #10 mesh screen and dried at 110°–130° F. for about 8 hours, and the dried material then passed through a #16 mesh screen. The guar gum and the balance of the starch are added and the mixture thoroughly blended. The remainder of the ingredients are then added and the whole thoroughly mixed and compressed.

EXAMPLE 7

A tablet having the following composition

|  | Mg. |
|---|---|
| 2-phenyl-5-methoxy benzimidazole | 250 |
| Dicalcium phosphate | 250 |
| Starch | 125 |
| Guar gum (60 mesh) | 17 |
| Talc (60 mesh) | 14 |
| Magnesium stearate (60 mesh) | 5 | is prepared in the following manner:

The dicalcium phosphate, 2-phenyl-5-methoxy benzimidazole and 50 mg. of starch are thoroughly mixed and the mixture reduced to a particle size finer than 60 mesh. 45 mg. of starch in the form of an aqueous starch paste is added to the mixture and the whole granulated in the usual manner. The granules are then passed through a #10 mesh screen and dried at 110°–130° F. for about 8 hours. The dried material is then passed through a #16 mesh screen. The guar gum and the balance of the starch are added and the mixture thoroughly blended. The remainder of the ingredients are then added and the mass mixed and compressed.

Any departure from the above description which conforms to the present invention is intended to be included within the scope of the claims.

What is claimed is:

1. A liquid drench useful for the control and prevention of helminthiasis comprising water, a suspending agent, and, as the active anthelmintic agent, about 5% to about 50% by weight of 2-phenyl benzimidazole.

2. A composition useful in the prevention and treatment of helminth infections in animals that comprises a compound of the general formula

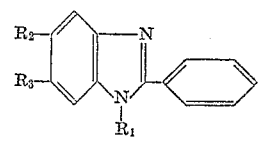

wherein $R_1$ is selected from the class consisting of hydrogen, lower alkyl, lower alkenyl, halophenylloweralkyl, phenylloweralkyl and phenylloweralkenyl groups, $R_2$ is selected from the class consisting of hydrogen, lower alkyl and lower alkoxy radicals, $R_3$ is selected from the class consisting of hydrogen and lower alkyl when $R_2$ is hydrogen or lower alkyl, and $R_3$ is hydrogen when $R_2$ is lower alkoxy, and nontoxic acid addition salts thereof, intimately dispersed in an animal feed in a composition of from 5–50% by weight.

3. The composition according to claim 2 wherein the compound is 2-phenyl benzimidazole.

4. An animal feed having distributed therein as an active anthelmintic agent 2-phenyl benzimidazole in a concentration of from about 0.5% to 2.0% by weight.

5. A liquid drench useful for the control and prevention of helminthiasis comprising water, a suspending agent, and about 5 to 50% of a compound of the general formula

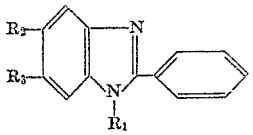

wherein $R_1$ is selected from the group consisting of hydrogen, lower alkyl, lower alkenyl, phenylloweralkyl, halophenylloweralkyl, and phenylloweralkenyl groups, $R_2$ is selected from the group consisting of hydrogen, lower alkyl and lower alkoxy radicals, $R_3$ is selected from the group consisting of hydrogen and lower alkyl when $R_2$ is hydrogen or lower alkyl, and $R_3$ is hydrogen when $R_2$ is lower alkoxy, and nontoxic acid addition salts thereof.

6. The method of controlling helminth infections in animals that comprises orally administering to a host animal infected with helminths a chemotherapeutic dose of 2-phenyl benzimidazole.

7. The method of controlling helminth infections in animals that comprises orally administering to a host animal infected with helminths a chemotherapeutic dose of a compound of the general formula

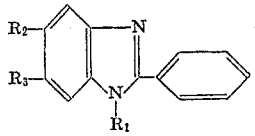

wherein $R_1$ is selected from the class consisting of hydrogen, lower alkyl, lower alkenyl, halophenylloweralkyl, phenylloweralkyl and phenylloweralkenyl groups, $R_2$ is selected from the class consisting of hydrogen, lower alkyl and lower alkoxy radicals, $R_3$ is selected from the class consisting of hydrogen and lower alkyl when $R_2$ is hydrogen or lower alkyl, and $R_3$ is hydrogen when $R_2$ is lower alkoxy, and nontoxic acid addition salts thereof.

FOREIGN PATENTS 955,861    Germany _____ Jan. 10, 1957

OTHER REFERENCES

Chem. Abst. (Fifth Decennial Index), 1947–1956, page 1635S.

Carlton: J. of the Chemical Society, 1951, pages 485 to 492 (particularly pages 485 and 488).